US006978131B1

(12) United States Patent
Lee

(10) Patent No.: US 6,978,131 B1
(45) Date of Patent: Dec. 20, 2005

(54) TESTING MOBILE PHONES

(75) Inventor: Michael John Lee, Middlesex (GB)

(73) Assignee: Anritsu Limited, Hertfordshire (GB)

( * ) Notice: Subject to any disclaimer, the term of this patent is extended or adjusted under 35 U.S.C. 154(b) by 515 days.

(21) Appl. No.: 10/018,549

(22) PCT Filed: Jun. 12, 2000

(86) PCT No.: PCT/GB00/02267

§ 371 (c)(1),
(2), (4) Date: May 20, 2002

(87) PCT Pub. No.: WO00/78063

PCT Pub. Date: Dec. 21, 2000

(30) Foreign Application Priority Data

Jun. 14, 1999 (GB) .................................. 9913843

(51) Int. Cl.[7] ............................ H04Q 7/20; H04B 1/60
(52) U.S. Cl. ............................ 455/423; 455/9; 455/10; 455/504
(58) Field of Search .................. 379/406.01; 455/423, 455/424, 425, 9, 10, 426.1, 18, 8, 13.3, 504, 455/503, 501, 67.11, 63.1, 65, 67.13, 67.14

(56) References Cited

U.S. PATENT DOCUMENTS

| 4,658,436 A | * | 4/1987 | Hill | 380/31 |
| 4,669,091 A | * | 5/1987 | Nossen | 375/232 |
| 5,875,216 A | * | 2/1999 | Martin | 375/347 |
| 6,687,500 B1 | * | 2/2004 | Causey | 455/423 |

OTHER PUBLICATIONS

Kall J: "The GSM System Simulator" Proceedings of the European Conference on Electrotechnics. (Eurocon), US, New York, IEEE, vol. CONF.8, 1988, pp. 478-481, XP000010527, p. 478, column 1, paragraph 1 -p. 479, column 2, paragraph 1 p. 480; figures 1-3.

* cited by examiner

Primary Examiner—Rexford Barnie
(74) Attorney, Agent, or Firm—Fliesler Meyer LLP

(57) ABSTRACT

An apparatus for testing a cellular phone comprising an RF signal generator (122) for transmitting an RF signal (RF10) to said cellular phone, said RF signal generator receiving an input digital signal (DSIG10) which determines the characteristics of the RF signal, means (112, 116) for providing said input digital signal comprising means for receiving a digital signal (DSIG4, DSIG5), and at least one set of digital means, each set (A, B, C) of digital means comprising:

Figure 7:
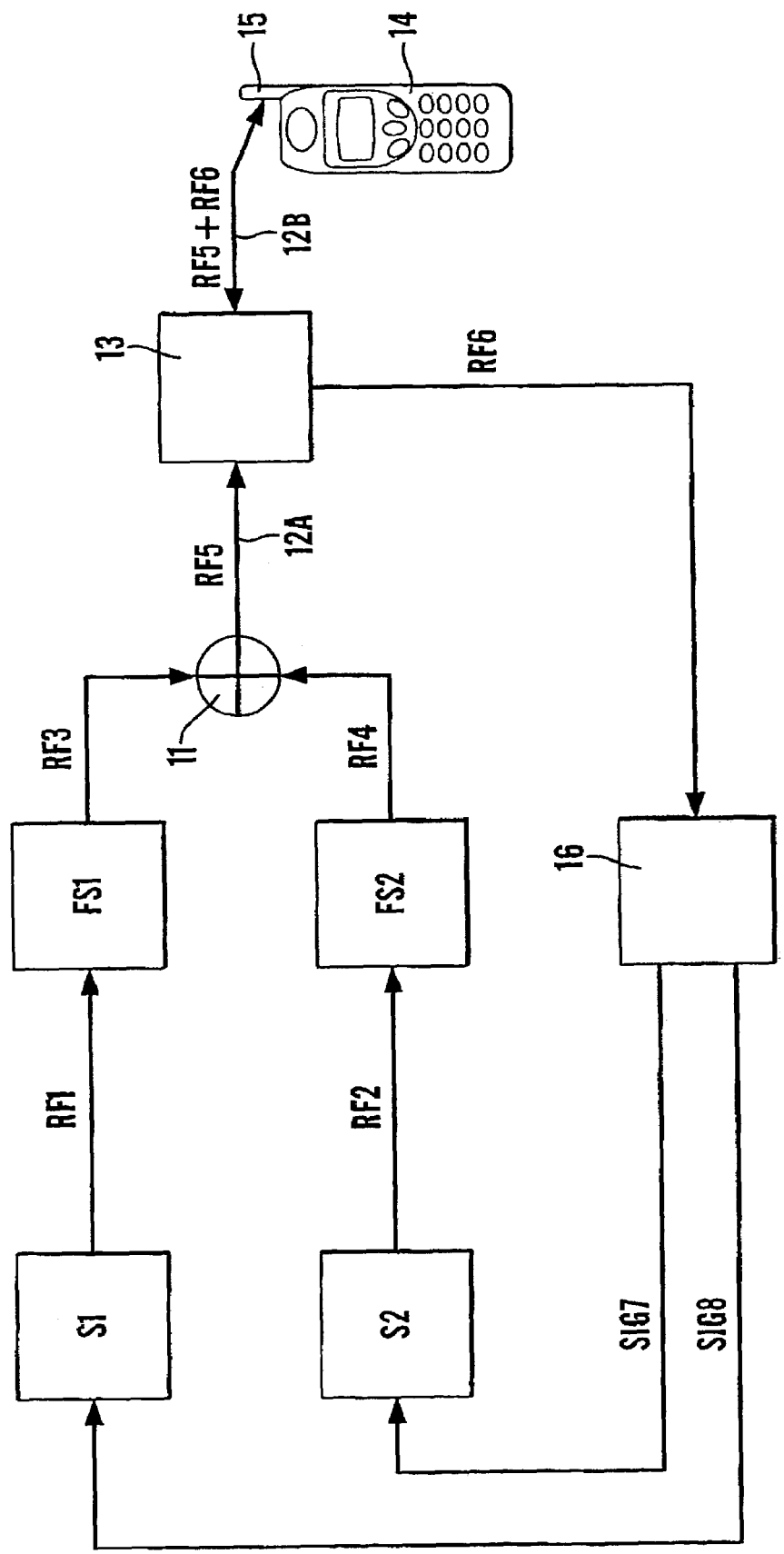

a first digital means (200, 201, 202) to provide a first digital signal element relating to a first characteristic of said RF signal, and a second digital means (MA, MB, MC) to provide a second digital signal element relating to a second characteristic of said RF signal, and a means (203) to combine said digital signal elements to provide said input signal to said RF signal generator, said first, second and third characteristics comprise phase, amplitude and delay respectively. Thus the signal processing is carried out in the digital phase which is more easily controlled.

13 Claims, 3 Drawing Sheets

TESTING MOBILE PHONES

The present invention relates to the testing of cellular mobile phones and in particular a method for testing third generation (3G) cellular mobile phones. 3G cellular radio systems will employ a new technique called Tx diversity in order to improve reception and increase the overall efficiency of the network. Two or more signal generator antennae will be used at each base station.

It is well known that mobile phone communications are provided by transmission of signals in both directions between an antenna at a base station and a mobile phone. Conditions may vary in the path between the base station and the mobile phone and this can create problems, such as fading. In first generation (analog) mobile telephony, the rate of information fed along the channel from the base station to the mobile phone (and vice versa) is relatively slow and the delay spread caused by changes in the environment between the base station and the mobile phone is less than one data symbol. For example, the delay spread is usually 15 microseconds or less. Thus, a mobile phone receiver does not notice this.

However, in more recent (second generation) mobile telephony, for example GSM, the transmission rate is much faster and so it is possible for the delay spread to be of the same order of magnitude as the information rate. (Eg one piece of information every 3.6 microsecond.) As a result, the signal when received by the GSM mobile phone may include echoes. There may be many echoes because the signal may be received by the mobile phone via a variety of different paths with different environmental effects.

The mobile phone will normally deal with this by tuning to each echo and combining all or several echoes to determine the transmitted information. The echoes may exhibit time diversity, that is echoes of the same data signal may arrive at different times (out of phase) and as a result, depending on the phase relationship of the echoes, the echoes may add or subtract which can create fading or increase of the signal. If the two echoes cancel each other out then the mobile phone, which provides an indication back to the base station of the signal strength which is it receiving, will effectively instruct the base station to increase the power output and this is undesirable for a number of reasons.

It has been proposed to overcome or reduce these problems in the 3G wireless telephony base stations by providing at some or all of the base stations two (or more) antennae usually separated by fractions or multiples of the wavelength of the signal, for example, half, one, two wavelengths and transmitting antenna specific signals such that a mobile phone can distinguish them and then feed back signals to separately correct the relevant antenna output.

The RF receiver in the 3G mobile telephone includes a system which can separate out a relevant part of the signals from the two antennae. The mobile phone measures the power and phase of the signal received from the first antenna and the power and phase of the signal received from the second antenna and transmits a signal back to the base station to cause the base station to adjust the phase and power between the two antennae so as to improve the reception at the mobile phone. In practice, each antenna transmits a signal which comprise two components, firstly a component which relates to the common information (ie traffic and typically relates to the information being transmitted to the mobile phone), and a second antenna specific signal (a pilot signal) which enables the mobile phone to distinguish which antenna is which.

The mobile phone uses the pilot signal to measure the phase and power received from each antenna and to thereby provide the information returned to the base station to adjust the output of the antennae. Thus the mobile phone returns to the base station a complex vector signal which sets out the relationship between the pilot signals from each antenna and generally will try to get the same power and same phase from each antenna. In a typical system, the mobile phone will send sixteen hundred correction signals per second back to the base station so that as the relative strengths and phases of the signals from each antenna vary in real time, the signals on the two antennae may be corrected so as to counter the effect of fading.

For a particular design of mobile phone to be approved for use with the system, it is necessary to be able to test that mobile phone to see whether or not it will be able to identify the signals from each antenna and sufficiently accurately measure the power and phase of the signals so as to be able to operate the system properly.

The present application relates to a method and apparatus for testing mobile phones, particularly 3G mobile phones in this way. Of course it is possible to test each individual mobile phone separately, but in practice the present arrangement is intended to be used for each particular design of mobile phone during its development so as to ensure that the design complies with the necessary standard. Such apparatus is also useful in conformance testing, research and development, as well as production.

It is preferred that the apparatus and method may simulate conditions found in real life, so that the signals between the two antennae may be set at particular static levels, and may also be dynamically varied.

A traditional approach which might be applied to testing 3G mobile phones is diagrammatically set out in FIG. 1. There is provided two (or more) base station simulators (S1, S2) which each provide a relevant RF (radio frequency) signal output, RF1, RF2, each RF output signal being passed through a respective fading simulator, FS1, FS2, and thereby providing a respective new RF signal, RF3, RF4. These two RF signals are combined in a summer 11 and the combined RF signal RF5 is passed by a coaxial line 12A, 12B via an extractor 13 to the antenna input 15 of a mobile phone 14 under test. The antenna of the mobile phone 14 transmits a signal RF6 (at a different frequency to RF5) which passes to the extractor 13 where it is separated from RF5 and passed to a signal processor 16 which provides two non-RF signal outputs SIG7, SIG8, dependent upon the power and phase of RF3, RF4 respectively. These signals, SIG7, SIG8, are passed to the base station simulators, S1, S2.

Such an arrangement, of course, replicates the system in the field, the two base signal simulators providing RF signals replicating those produced by the two antennae, and the two RF signals being summed to be passed to the mobile phone 14, and the signal RF6 replicating the return signal to the antennae. There are a number of problems associated with this arrangement and these generally relate to the summer 11, to the various coaxial cables and the extractor 13. The coaxial cable is important. The length of the coaxial cable is particularly important because there is a phase change along the length of the coaxial cable. Thus, in terms of the length of cable between S1, S2 and the summer 11 there may be an unintentional phase change, and the summer can introduce a phase change. The coaxial cable can also introduce reflections into the system. It is also difficult to accurately maintain and generate the same power outputs via two fading simulators. In practice it is necessary to measure the signal passing along the coaxial cable 11 to adjust the various components including the base station simulators S1, S2 and the fading simulators FS1, FS2 so as to provide a signal of a known desired type to the mobile phone 14.

There are similar problems in dealing with the signal RF6.

The present invention relates to a method and apparatus arranged so as to reduce or remove the above problems.

Reference may also be made to Kall J: 'the GSM system simulator' proceedings of the European conference on Electrotechnics. (Eurocon), US, New York, IEEE, vol. Conf. 8, 1988, pages 478–481, which discloses GSM system simulator comprising a collection of emulation and measurement tools to be used when testing mobile stations for conformance with the CEPT/GSM recommendations.

Reference may also be made to the U.S. Patent Specification, 4 669 091 which discloses a communication system which transmits information which may be in the form of frames or busts of suppressed-carrier data over a dispersive transmission path which introduces multipath distortion. Each frame is stored as it is received and processed by iteratively simulating the multipath distortion, subtracting the distortion from the stored frame to form a corrected signal, and evaluating the quality of the resulting signal. The quality of the resulting signal is determined by frequency multiplying the corrected signal and evaluating the total power of components other than the frequency multiplied carriers. The iterative procedure adjusts the phase and, if desired, the amplitude of signals tapped from a delay line.

The present invention provides an apparatus for testing a radio apparatus of a type which receives a radio frequency (RF) signal from a RF signal generator and sends a RF signal to a receiver to modify the characteristics of the RF signal transmitted by said signal generator, said apparatus comprising:

an RF signal generator for transmitting an RF signal (RF10) to said radio apparatus, and means to receive an input digital signal (DSIG10), which signal generator controls the characteristics of the RE signal (RF10) transmitted in accordance with the input digital signal (DSIG10);

an RF receiver for receiving an RF signal (RF11) from said radio apparatus, said RF receiver including means to generate an output digital signal (DSIG14, DSIG15) having characteristics dependent on the characteristics of the RF signal (RF11) received;

a digital signal generator for generating and outputting a digital signal (DSIG3);

signal modifying means connected to receive said digital signal (DSIG3) from said digital signal generator and to receive said digital signal (DSIG14, DSIG15) from said RF receiver whereby to modify said digital signal (DS1G3) from said digital signal generator in accordance with said digital signal (DSIG14, DSIG15) from said RF receiver to thereby output a first modified digital signal (DSIG11, DSIG12) to provide the basis of said digital signal (DSIG10) input to said RF signal generator.

The present invention may also provide an apparatus for testing a cellular phone comprising an RF signal generator for transmitting an RF signal (RF10) to said cellular phone;

an RF receiver for receiving an RF signal (RF11) from said cellular phone, said RF receiver generating first and second digital signals (DSIG14, DSIG15) relating to different characteristics of the received RF signal (RF11);

a digital signal generator for generating a digital signal (DSIG3), which digital signal is passed to a first and a second channel;

a first antenna specific digital signal generator;

a second antenna specific digital signal generator;

whereby the digital signal (DSIG3) from the first digital signal generator in the first channel is modified by the first of the digital signals (DSIG14) from the RE receiver and in the second channel is modified by the second of the digital signals (DSIG15) from the RF receiver, the modified digital signal (DSIG12) in said first channel being further modified by a digital signal (DSIG2) provided by the first antenna specific digital signal generator, and the modified digital signal (DSIG11) in the second channel being further modified by a digital signal (DSIG1) from the second antenna specific digital signal generator;

a first fading simulator being provided in the first channel to modify the further modified digital signal (DSIG5) passing along said channel in such a manner as to replicate a preferred pattern of variation;

a second fading simulator being provided in the second channel to modify the further modified digital signal (DSIG14) passing along said channel in such a manner as to replicate a preferred pattern of variation;

the digital signals (DSIG7,DSIG5) from the first and second fading simulators being combined to provide an input signal (DSIG8,DSIG10) to the RF signal generator;

whereby as the fading simulators modify the relevant digital signals to thereby modify the RF signal (RF10) provided by the RF signal generator, the cellular telephone provides a feed back signal (RF11) which modifies the digital signals in the two channels so as to compensate for the effect of the fading simulators in a measurable manner.

The present invention may also provide an apparatus for providing an analog signal having predetermined characteristics comprising:

analog signal generator for receiving an input digital signal (DSIG10) and providing an output analog signal (RF10) having characteristics determined by the input digital signal (DSIG10) input thereto:

means for providing said input digital signal comprising means for receiving a digital signal (DSIG4, DSIG5), and at least one set of digital means, each set (A, B, C) of digital means comprising:

a first digital means to provide a first digital signal element relating to a first characteristic of said analog signal, and a second digital means (MA, MB, MC) to provide a second digital signal element relating to a second characteristic of said analog signal, and a means to combine said digital signal elements to provide said input signal to said analog signal generator.

A preferred embodiment will now be described by way of example only and with reference to the accompanying drawings in which:—

FIG. 1 shows in diagrammatic form a traditional approach applied to test 3G mobile phones.

Figure 2:
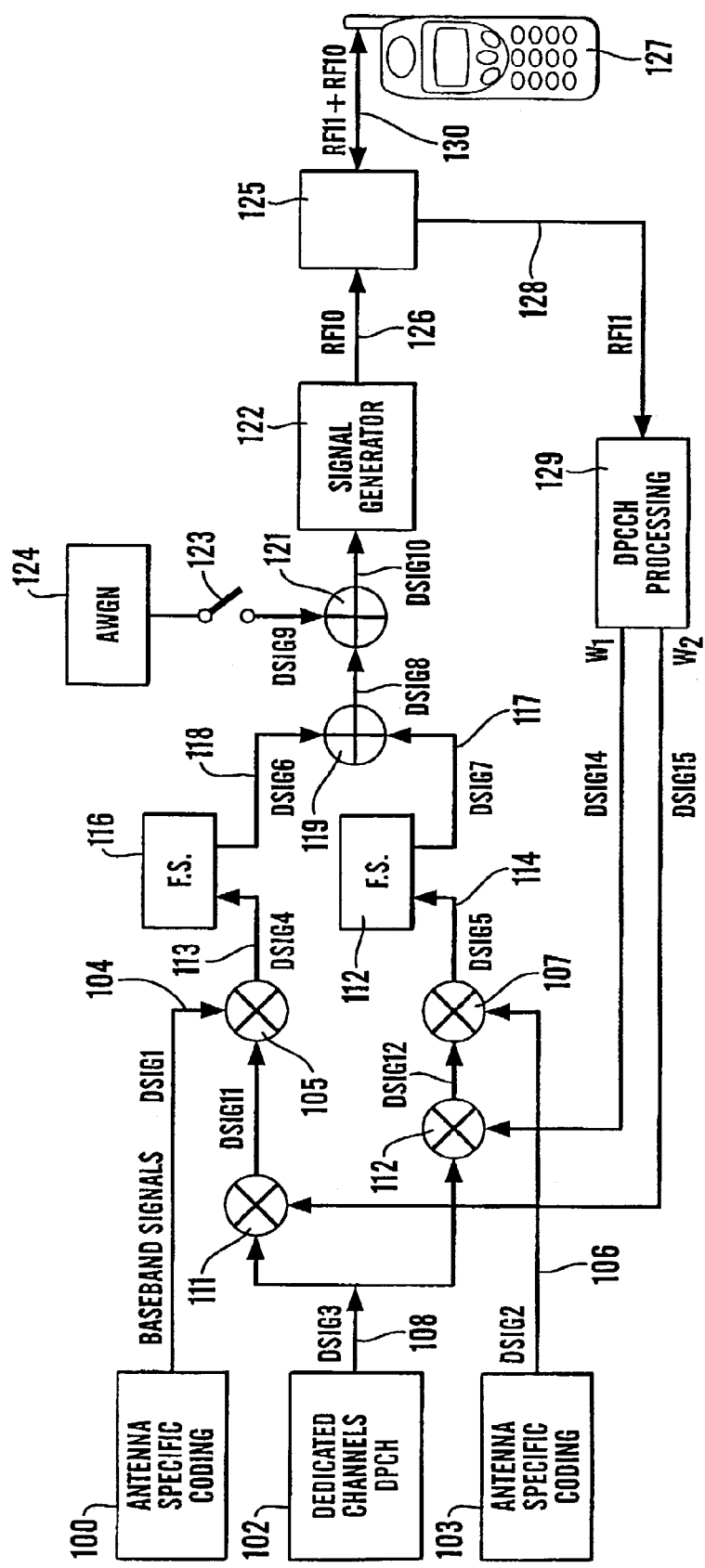
Figure 3:
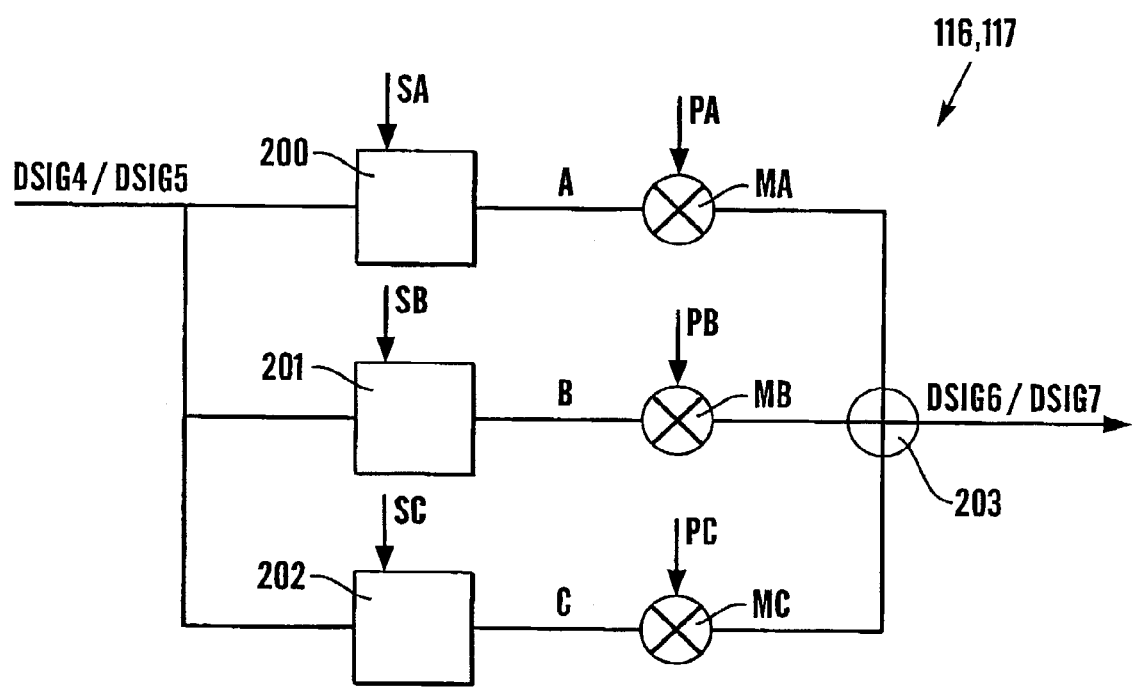

FIG. 2 sets out the apparatus of the invention diagrammatically, and,

FIG. 3 shows in diagrammatic form the arrangement of each fade simulator.

Referring to FIG. 2 there are shown three baseband (ie non-RF) digital signal generators, 100, 102, 103, signal generator 100 producing an antenna specific coding signal DSIG1 which, relates to the pilot signal of a first antenna. The output signal DSIG1 which is digital is passed along line 104 to a multiplier 105. The baseband digital signal generator 103 produces an antenna specific coded signal DSIG2 similar to that produced by 100 but relating to the pilot signal of the second antenna. The output digital signal DSIG2 is passed via line 106 to a multiplier 107.

Baseband digital signal generator 102 is arranged to provide, in digital form, the common channel signal DSIG3 (corresponding, for example, to the traffic signal carrying, for example, the telephone message) and is passed via line 108 and multipliers 111, 112, respectively to multipliers 105, 107. The digital output signal DSIG4 of the multiplier 105 is passed via line 113 to a fading simulator 116 to be described in more detail with reference to FIG. 3 later and the digital output signal DSIG5 of multiplier 107 is similarly passed along line 114 to a fading simulator 112 to be described in more detail with reference to FIG. 3 later. The output signal DSIG6 of fading simulator 116 is passed via line 118 to a summer 119 and similarly the output signal DSIG7 of the fading simulator 112 is passed via line 117 to the other input of the summer 119. The output signal DSIG8 of the summer 119 is passed via summer 121 to a radio frequency signal generator 122. The summer 121 is also connected via switch 123 to a noise generator, in particular, an Additive Gaussian White Noise generator 124 (which simulates traffic on the network). It will be noted that the signal input to the generator 122 is a digital baseband signal.

The components 103, 112, 107, 112, provide a first channel A and the components 100, 111, 105, 116, provide a second channel B.

The RF output signal RF10 from the signal generator 122 is provided to an RF line 126 in the form of coaxial cable connected to an antenna input of a mobile phone 127 under test via a separator 125.

The radio frequency output signal RF11 from the antenna port of the mobile phone 127 when separated by separator 125 is passed by a coaxial line 128 to a processing apparatus 129.

The processing apparatus 129 processes the signal received and provides two output signals W1 and W2 on lines 131, 132 respectively, which are passed to the other inputs of the multipliers 112, 111 respectively.

The apparatus of FIG. 2 operates as follows.

A mobile phone 127 to be tested is connected to the apparatus as shown in FIG. 2. The mobile phone may be a phone in the design or development phase whereby the apparatus may be used to test the efficiency of operation of the design, or alternatively, may be used to test production mobile phones.

The antenna or an antenna port of the mobile phone is connected to the coaxial line 130 by a suitable connector.

In use, the two baseband digital signal generators 100, 103 provide a respective digital baseband signal, each of which is multiplied with the common channel signal provided by the signal generator 102 at the respective multipliers 105, 107. Fading simulators 116, 117 are operated in accordance with a prearranged schedule (to be described later) and the two signals from the respective fading simulators are combined at summer 119, are furthermore combined with the white signal noise at summer 121 and the combined digital signal is used to control the RF signal generator 122 which thereby provides a signal RF10 based on the combined data signal.

In a first test procedure, the outputs of the various signal generators 100, 102, 103, and the operation of the fading simulators 116, 117, are set to preset static conditions so as to produce at 118, 117, digital signals which relate to RF signals which are of a known power level and phases which are of a known offset. The mobile phone 127 is then tested and the relevant values determined by the phone 127 are compared with the known offset and known signal level and these must agree to within specified limits.

Before describing a second operation of the apparatus in which the fading simulators 116, 117 are operated in accordance with a prearranged schedule, which will be described later, it is convenient at this point to describe the operation of the fading simulators used in a preferred embodiment of the invention.

We will now describe the fading simulators 117, 116 with reference to FIG. 3. The fading simulators are devices which take an input signal DSIG4 or DSIG5 and produce an output DSIG6 or DSIG7 respectively in which:—

(a) the phase of the output signal is selectively varied with respect to the phase of the input signal, and the amplitude of the output signal is selectively varied with respect to the amplitude of the input signal, and/or (b) the output signal DSIG6 or DSIG7 includes plural components which correspond to echoes, each of the plural components having a variable amplitude and variable phase with respect to the input and with respect to each other.

In essence, the input signal (DSIG14, DSIG15) to the fading simulator is passed to a plurality of parallel channels A, B, C each of which includes a respective variable delay apparatus (200, 201, 202). The delay to the signal created by the delay apparatus may either be statically arranged or the delay apparatuses may be controlled by a respective control signal (SA, SB, SC respectively) applied to each delay apparatus to vary the delay in a known or random manner.

The outputs of each delay are passed to a respective multiplier (MA, MB, MC). Each multiplier has an input to which a complex control signal (PA, PB, PC) is provided, the complex signal either being preset or varied in a known or random manner. The outputs of the multipliers are combined in summer (203) to provide a single signal output (DSIG6, DSIG5) which carries a signal which has a number of components corresponding to the number of delays which thereby have independent variable amplitudes and independent variable phase shifts, and it will be understood that the amplitude and phase shifts may be static or may be changed in accordance with a known pattern, or may be changed in a random manner. Each of these signal components produced by the channels A, B, C respectively will effectively correspond to a separate echo in the RF signal (RF10) and will be handled by the mobile phone as if they were echos produced in the field.

Thus in the second operation of the apparatus, in distinction to the first operation of the apparatus in which the signal DSIG6 or DSIG7 has a number of components with a fixed relationship with respect to amplitude and phase to the input signal DSIG4 or DSIG5, the phase and amplitude of the components of the signal DSIG6 and DSIG7 will vary with time either in a random manner or in a predetermined manner. (It is useful to use a predetermined pattern of variation because this enables one then to compare different mobile phones with exactly the same signal.)

The way in which the efficiency and operation of the mobile phone is tested in this case is to arrange for the signal generator 102 to provide a prearranged digital pattern, and for the mobile phone to report the error bit rate. The error bit rate must be within predetermined limits and also it may be shown by switching off the feed back arrangements (for example by breaking the link 128) that the mobile phone when utilising the system calling the invention provides an improved error bit rate than without using the system of the invention.

It will be understood that the present invention provides an improved apparatus for testing mobile phones in this environment.

In the described arrangement, there is only a single RF signal generator 122 and the simulation of the two antennae takes place in the baseband digital domain between the signal generators 100, 102, 103 and fading simulators 116, 117. Since the signals are digital at this point, the relative level and phase can be very accurately controlled.

Since it is mainly the relative values that are important (for each antenna) and since they are all in the digital domain, the system is intrinsically accurate. Absolute levels are more easily controlled and only one RF generator is required.

The invention is not restricted to the details of the foregoing example.

The Additive Gaussian White Noise generator 124 provides a noise source which in the example shown in FIG. 2 is summed in the digital domain but clan if necessary be applied to the RF signal output from the RF signal generator 122. By the arrangement provided, only a single such noise source is required.

What is claimed is:

1. An apparatus for testing a radio apparatus of a type which receives a radio frequency (RF) signal from a RF signal generator and sends a RF signal to a receiver to modify the characteristics of the RF signal transmitted by said signal generator, said apparatus comprising:

an RF signal generator (122) for transmitting an RF signal (RF10) to said radio apparatus (127), and means to receive an input digital signal (DSIG10), which signal generator (122) controls the characteristics of the RF signal (RF10) transmitted in accordance with the input digital signal (DSIG10);

an RF receiver (129) for receiving an RF signal (RF11) from said radio apparatus (127), said RF receiver (129) including means to generate an output digital signal (DSIG14, DSIG15) having characteristics dependent on the characteristics of the RF signal (RF11) received;

a digital signal generator (102) for generating and outputting a digital signal (DSIG3);

signal modifying means (111, 112) connected to receive said digital signal (DSIG3) from said digital signal generator (102) and to receive said digital signal (DSIG14, DSIG15) from said RF receiver (129) whereby to modify said digital signal (DSIG3) from said digital signal generator (102) in accordance with said digital signal (DSIG14, DSIG15) from said RF receiver to thereby output a first modified digital signal (DSIG11, DSIG12) to provide the basis of said digital signal (DSIG10) input to said RF signal generator (122), wherein, said RF receiver (129) includes means to generate two output digital signals (DSIG14, DSIG15) having characteristics based on different characteristics of the RF signal (RFII) received by the receiver (129), and there are provided a second and third digital signal generators (100, 103) which output respective digital signals (DSIG1, DSIG2), said signal modifying means (111, 112) comprising first and second signal modifying means (111, 112) connected to respectively receive a digital signal (DSIG3) from said first digital signal generator (102) and to receive a respective digital signal (DSIG14, DSIG15) from said RF receiver (129) whereby to modify said digital signal (DSIG3) from said first digital signal generator (102) in accordance with said digital signal (DSIG14, DSIG15) from said RF receiver to thereby output a respective first and second modified signal (DSIG11, DSIG12), third and fourth signal modifying means (105, 107) connected to receive a digital signal (DSIG1, DSIG2) from a respective one of the second or third digital signal generators (100, 103) and connected to receive said digital signal (DSIG11, DSIG12) from a respective one of said first or second signal modifying means 111, 112 whereby to modify the respective modified digital signal (DSIG11, DSIG12) in accordance with said digital signal (DSIG1, DSIG2) from the relevant second or third digital signal generator (100, 103) and to thereby output third and fourth modified digital signals (DSIG4, DSIG5), a combination of digital signals derived from said third and fourth modified signals (DSIG4, DSIG5) providing said digital signal input to said RF signal generator (122).

2. Apparatus as claimed in claim 1 in which said radio apparatus comprises a cellular phone.

3. Apparatus as claimed in claim 1 or claim 2 in which there is provided a second digital signal generator (100, 103) for generating and outputting a digital signal (DSIG1, DSIG2), second signal modifying means (105, 107) being connected to receive the digital signal (DSIG, DSIG2) from said second digital signal generator (100, 103) and connected to receive said first modified digital signal (DSIG11, DSIG12) from said first signal modifying means (111, 112) whereby to modify said first modified digital signal (DSIG11, DSIG12) in accordance with said digital signal (DSIG1, DSIG2) from said second digital signal generator (100, 103) to thereby output a second modified digital signal (DSIG4, DSIG5) to provide the basis of said digital signal (DSG10) input to said RF signal generator (122).

4. Apparatus as claimed in claim 3 including a digital fading simulator (112, 116), connected to receive said second modified digital signal, the output (DSIG6, DSIG7) of the digital fading simulator comprising the second modified digital signal (DSIG4, DSIG5) the characteristics of which have been modified.

5. Apparatus as claimed in claim 4 in which said digital fading simulator includes means to change at least one of said digital signal elements of said second modified digital signal (DSIG4, DSIG5) to thereby change the phase or amplitude or delay of the RF signal (RF10) transmitted by said RF signal generator (122).

6. Apparatus as claimed in claim 5 in which the fading simulator includes means to vary one or more of said digital signal elements in accordance with a predetermined pattern with respect to time.

7. Apparatus as claimed in claim 1 in which the digital signal generator outputs a digital signal including digital signal elements relating to one or more of phase, amplitude, and delay in respect of the resultant RF signal (RF10) transmitted by the RF signal generator (122).

8. Apparatus as claimed in claim 1 or claim 2 including:
a first digital fading simulator (116), connected to receive said third modified digital signal (DSIG4), the output (DSIG6) of the first digital fading simulator (116) comprising a fifth modified digital signal (DSIG6) the characteristics of which have been modified by said first digital fading simulator;
a second digital fading simulator (112), connected to receive said fourth modified digital signal (DSIG5), the output (DSIG6) of the second digital fading simulator (116) comprising a sixth modified digital signal (DSIG7) the characteristics of which have been modified by said second digital fading simulator; and a digital signal combines means (119) to combine said fifth and sixth digital signal to provide a seventh digital signal (DSIG8).

9. Apparatus as claimed in claim 8 in which each digital fading simulator (116, 112) includes means to change at least one of said digital signal elements of said third or fourth modified digital signal (DSIG4, DSIG5) to thereby change the phase or amplitude or delay of the RF signal (RF10) transmitted by said RF signal generator (122).

10. Apparatus as claimed in claim 9 in which each digital fading simulator (116, 112) includes means to vary one or more of said digital signal elements in accordance with a predetermined pattern with respect to time.

11. Apparatus as claimed claim 1 in which it is provided a white noise digital signal generator (124), the digital output signal DSIG9 of said white noise digital signal generator being applied to the digital signal applied to digital signal DSIG10 input to said RF signal generator (122).

12. Apparatus as claimed in claim 2 in which said first digital signal generator (102) provides a digital signal (DSIG3) corresponding to a common channel RF signal when applied to the RF signal generator (122), and said second and third digital signal generators (100, 103) provide output digital signals DSIG1 and DSIG2 which correspond to antenna specific RF signals when applied to said RF signal generator (122).

13. An apparatus for testing a cellular phone comprising
an RF signal generator (122) for transmitting an RF signal (RF 10) to said cellular phone;
an RF receiver (129) for receiving an RF signal RF11) from said cellular phone (127), said RF receiver (129) generating first and second digital signals (DSIG14, DSIG15) relating to different characteristics of the received RF signal (RF11);
a digital signal generator (102) for generating a digital signal (DSIG3), which digital signal is passed to a first and a second channel;
a first antenna specific digital signal generator (103);
a second antenna specific digital signal generator (100);
whereby the digital signal (DSIG3) from the first digital signal generator in the first channel is modified by the first of the digital signals (DSIG14) from the RF receiver (129) and in the second channel is modified by the second of the digital signals (DSIG15) from the RF receiver (129), the modified digital signal (DSIG12) in said first channel being further modified by a digital signal (DSIG2) provided by the first antenna specific digital signal generator (103), and the modified digital signal (DSIG11) in the second channel being further modified by a digital signal (DSIG1) from the second antenna specific digital signal generator (100);
a first fading simulator (112) being provided in the first channel to modify the further modified digital signal (DSIG5) passing along said channel in such a manner as to replicate a preferred pattern of variation;
a second fading simulator (116) being provided in the second channel to modify the further modified digital signal (DSIG14) passing along said channel in such a manner as to replicate a preferred pattern of variation;
the digital signals (DSIG7,DSIG5) from the first and second fading simulators being combined to provide an input signal (DSIG8,DSIG10) to the RF signal generator (122);
whereby as the fading simulators modify the relevant digital signals to thereby modify the RF signal (RF10) provided by the RF signal generator (122), the cellular telephone provides a feed back signal (RF11) which modifies the digital signals in the two channels so as to compensate for the effect of the fading simulators in a measurable manner.

* * * * *